United States Patent [19]

Picard et al.

[11] 4,435,194

[45] Mar. 6, 1984

[54] CIRCUIT FOR VENTILATING AND FILTERING THE MEDIUM CONTAINED IN A CONFINEMENT ENCLOSURE

[75] Inventors: Claude Picard, Nanterre; Bernard Saint Martin, Paris, both of France

[73] Assignee: La Calhene, Bezons, France

[21] Appl. No.: 372,327

[22] Filed: Apr. 22, 1982

Related U.S. Application Data

[63] Continuation-in-part of Ser. No. 230,624, Feb. 2, 1981, abandoned.

[30] Foreign Application Priority Data

Feb. 12, 1980 [FR] France ............................ 80 03067

[51] Int. Cl.³ ............................ B01D 46/04

[52] U.S. Cl. ............................ 55/96; 55/210; 55/279; 55/385 A; 119/15; 98/115 LH; 422/29; 422/295; 417/5; 417/426

[58] Field of Search ............ 55/279, 210, 213, 467, 55/473, 385 A, DIG. 29; 422/4, 34, 40, 112, 192, 29, 295, 306; 128/1 R, 1 B; 98/33 R, 115 LH, 43 R; 417/5, 426; 119/15

[56] References Cited

U.S. PATENT DOCUMENTS

| | | | |
|---|---|---|---|
| 2,007,738 | 7/1935 | Baer | 422/34 |
| 2,880,819 | 4/1959 | King et al. | 55/213 |
| 3,257,161 | 6/1966 | Kaye | 422/34 |
| 3,434,282 | 3/1969 | Shelhart | 417/510 |
| 3,751,184 | 8/1973 | Buchwald et al. | 417/426 |
| 3,893,832 | 7/1975 | Perry et al. | 55/279 |
| 3,946,887 | 6/1976 | Hickey et al. | 55/210 |
| 3,966,407 | 6/1976 | Zuckerberg et al. | 98/33 |
| 4,018,568 | 4/1977 | Brewer | 55/210 |
| 4,119,400 | 10/1978 | Kurz | 422/306 |

FOREIGN PATENT DOCUMENTS

| | | | |
|---|---|---|---|
| 2203027 | 8/1973 | Fed. Rep. of Germany | 422/4 |
| 2308012 | 8/1974 | Fed. Rep. of Germany | 422/4 |
| 2428613 | 1/1976 | Fed. Rep. of Germany | 422/306 |
| 2731066 | 1/1979 | Fed. Rep. of Germany | 55/350 |
| 52-28736 | 7/1977 | Japan | 55/385 A |

*Primary Examiner*—Bernard Nozick

*Attorney, Agent, or Firm*—Kerkam, Stowell, Kondracki & Clarke

[57] ABSTRACT

The invention relates to a circuit for ventilating and filtering the medium contained in a confinement enclosure (10) and also a method for sterilizing such an enclosure and its supply and discharge filters.

An emergency or standby circuit is associated with the circuit ensuring ventilation and filtration under normal operating conditions and which comprises a supply pipe (20) and a discharge pipe (12), equipped with a suction fan (14). The said emergency circuit comprises the same pipes used in the opposite direction under the action of a suction fan (28) located in supply pipe (20), whereby said fan (28) can be automatically controlled by a pressostat (30). Sterilization is performed chemically, using a sterilizer which is connected to the supply duct between a valve and the supply filters disposed downstream of the valve. The sterilizer delivers a sterilizing agent which passes successively through the supply filters, the enclosure and the discharge filters. Once sterilization has been performed, the ventilating circuit is started up, so as to sweep away the sterilizing agent.

Application to biological or nuclear experimentation enclosures.

21 Claims, 1 Drawing Figure

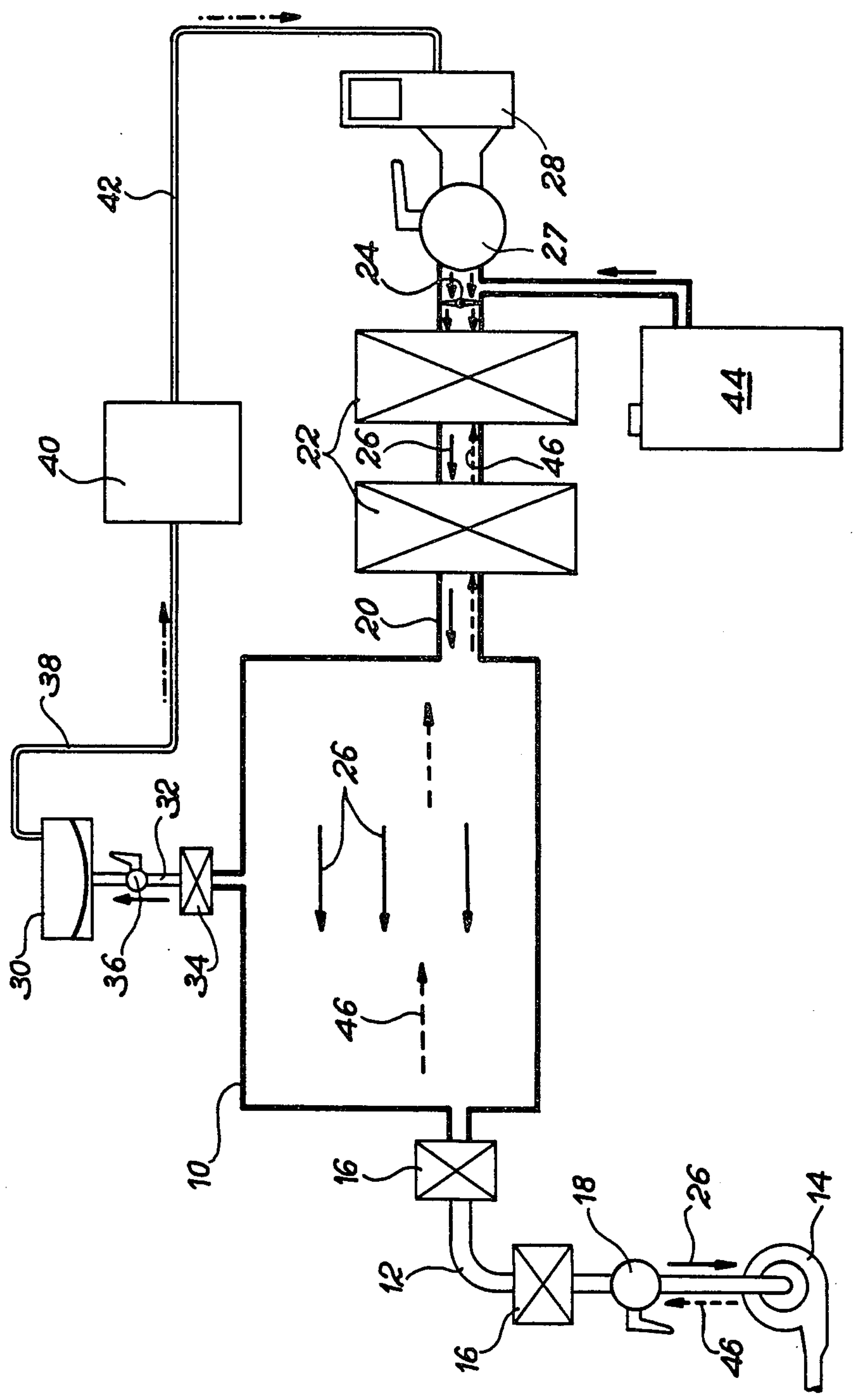
10
12
14
16
16
18
20
22
24
26
26
26
27
28
30
32
34
36
38
40
42
44
46
46
46

CIRCUIT FOR VENTILATING AND FILTERING THE MEDIUM CONTAINED IN A CONFINEMENT ENCLOSURE

REFERENCE TO RELATED APPLICATION

This application is a continuation-in-part application of Ser. No. 230,624 filed Feb. 2, 1981 and now abandoned.

The present invention relates to a circuit for ventilating and filtering the medium contained in a tight enclosure, this circuit comprises a main circuit and an emergency or standby circuit making it possible to ensure the ventilation and filtration in the case when the main circuit fails or when there is a break in the seal of the enclosure. The invention also relates to a method for the sterilization of such an enclosure and the upstream and downstream filters of the ventilating circuit associated therewith.

More specifically the invention applies to the case when the medium contained in the enclosure represents a contamination hazard for persons in the vicinity thereof. This is more particularly the case when the tight enclosure is used for carrying out biological experiments or manipulations, for example on viruses or bacteria.

In known manner personnel are protected in the case of a microleak in the enclosure by producing a permanent vacuum therein. This vacuum is generally produced by means of a motor-operated fan located in a discharge pipe, which is also equipped with filtering means making it possible to remove or transfer gases without the latter becoming contaminated. In particular the discharge pipe may open to the exterior of the building in which the confinement enclosure is located, in order to prevent residual vapours from the enclosure, e.g. during sterilization operations, being prejudicial to persons present in the room.

A supply pipe equipped with filtering means and in which the flow rate is regulated is generally associated with the discharge pipe. In combination with the discharge pipe, the supply pipe makes it possible to regularly remove the medium contained in the enclosure. Such a renewal is necessary when the calories or a gas such as water vapour are given off within the enclosure, e.g. by a motor, bath or oven, or when living beings in the enclosure require a regular supply of a certain volume of fresh air.

In ventilating and filtering circuits of this type, the present invention serves to maintain the vacuum within the enclosure and ensures the renewal of the medium contained therein if the normal ventilating circuit fails as a result e.g. of a stoppage of the motor, or in the case of a leak in the enclosure. More specifically the present invention relates to the construction of a ventilating and filtering circuit making it possible to achieve this result without it being necessary to provide two complete, independent circuits, i.e. without significantly increasing the cost of the installation.

In addition to the negative pressure enclosures used more particularly in virology, the invention also applies to sterile enclosures in which an excess pressure must be maintained, to prevent the medium which the enclosure contains from being contaminated by the outside environment.

In known manner, the ventilating and filtering circuit of the medium contained in the enclosure is of the same kind as the circuit used for negative pressure circuits, except that the supply and discharge ducts are reversed, and the motor-driven fan in that case disposed in the supply duct is so mounted as to blow towards the enclosure to set up an excess pressure inside the enclosure.

Another object of the invention is to maintain the excess pressure inside such an enclosure, while continuing to ensure the renewal of the medium contained in the enclosure in case of failure of the normal ventilating circuit, or in case of leakage from the enclosure, without requiring the circuit to be doubled.

The invention also relates to a method allowing the chemical sterilization of a confinement enclosure of any volume, whose walls can be either thin and resilient or thick and rigid, ensuring effective protection to the personnel outside the enclosure.

More precisely, when the enclosure forms an insulator adapted to keep germ-free animals in a sterile atmosphere, in which case the bacteriologically sealed enclosure protects the animals from people and the environment, via which micro-organisms outside the closed volume may arrive, the method according to the invention enables the confinement enclosure and the supply and discharge filters to be sterilized automatically, without the need for personnel to take direct action inside the closed volume.

The chemical sterilization according to the invention must be distinguished from sterilization by humid heat (autoclave treatment).

The invention also applies exclusively to chemical sterilization by air, since it is difficult to apply sterilization by liquid to the sterilization of relatively large closed volumes. Moreover, sterilization by liquid requires the presence of complex scavenging circuits to take into account the differences in level between the different parts of the circuit to be sterilized, and in order to recover the sterilizing liquid when sterilization has been performed. In contrast, sterilization gas can be more readily evacuated or destroyed.

From this aspect the known chemical sterilization techniques using liquid cannot be immediately transferred to chemical sterilization by gas, since the sterilization gas acts quickly in depth only when it is pressurized; clearly, this cannot be considered when the enclosure walls are thin and resilient, as is generally the case.

Lastly, the only known method for the chemical sterilization of a confinement enclosure by gas consists in introducing a sterilizer to the enclosure. Clearly, such a method has the disadvantage of requiring personnel to enter the closed volume at the start and finish of the sterilizing operation, with the resulting contamination problems which arise in relation both to the personnel and the volume to be confined. Moreover, sterilization is incomplete, since there is a risk that the sterilizing gas may not pass through the supply and discharge filters.

According to a first aspect, the present invention relates to a circuit for ventilating and filtering the medium contained in a tight enclosure comprising a supply pipe equipped with flow rate regulating means and filtering means, and a discharge pipe equipped with filtering means and means for establishing a vacuum within the enclosure, wherein it comprises second means for producing a vacuum within the enclosure located in the supply pipe upstream of the filtering means.

As a result of this feature if the first means for producing a vacuum within the enclosure or in the case of a break in the enclosure seal fail, the medium contained in the enclosure is sucked up by the supply pipe and is automatically renewed by the discharge pipe, as well as in the case of a possible leak in the enclosure wall, in such a way that the said pipes fulfil opposite functions depending on whether the circuit is operating normally or is operating on an emergency basis.

According to a preferred embodiment of the invention the ventilating and filtering circuit also comprises means for detecting a drop in the pressure within the enclosure, which automatically controls the starting up of the second means for producing a vacuum within the enclosure. The detection means can be constituted by a pressostat connected with the enclosure by a pipe in which are located the filtering means and means for interrupting the connection between the enclosure and the pressostat. This is particularly the case when it is necessary to sterilize the medium in the enclosure.

According to another feature of the invention the power of the second means for producing a vacuum within the enclosure is greater than that of the first means for producing a vacuum within the enclosure. This is in order to ensure that the vacuum remains at an acceptable level, even in the case of a break in the enclosure seal.

In its second aspect, the invention proposes a circuit for ventilating and filtering the medium contained in a sealed enclosure and for establishing and maintaining a permanent excess pressure therein, comprising a normal ventilating circuit, means for introducing the medium into the circuit including a supply pipe issuing into the enclosure to supply the enclosure with said medium, and a discharge pipe which discharges the medium from the enclosure in a normal flow direction, flow rate regulating means and first filtering means for said discharge pipe, second filtering means and means for establishing the over-pressure within the enclosure for said supply pipe, said circuit further comprising means for maintaining the over-pressure within the enclosure, said means for maintaining the over-pressure including means for actuating said over-pressure maintaining means upon a predetermined decrease in pressure in the enclosure in case of failure in the normal ventilating circuit, said means for maintaining the over-pressure being located in said discharge pipe downstream of said first filtering means reversing the flow of the medium in the circuit from the normal direction of flow.

This circuit has moreover substantially the same features as the preceding circuit adapted, however, to the need for establishing, maintaining and detecting not a negative pressure, but an excess pressure inside the enclosure.

In its third apsect, the invention provides a method of sterilizing an air tight enclosure containing a medium ventilated and filtered by means of a ventilating circuit, means for introducing the medium into the circuit including a supply pipe issuing into the enclosure to supply the enclosure with said medium, and a discharge pipe which discharges the medium from the enclosure in a normal flow direction, valve means upstream of first filtering means for said supply pipe, second filtering means and means for establishing the vacuum within the enclosure for said discharge pipe, said process comprising the steps of:

- connecting a chemical sterilizer to the supply pipe between the valve means and the first filtering means;
- closing said valve means;
- operating said means for establishing the vacuum within the enclosure;
- operating said sterilizer for supplying saturating vapors of a sterilizing chemical agent succesively to the supply pipe, including the first filtering means, to the tight enclosure and to the discharge pipe, including the second filtering means;
- stopping said sterilizer after a given period of time;
- opening said valve means;
- pursuing operation of said means for establishing the vacuum within the enclosure to sweep the saturating vapors of the sterlizing chemical agent.

Preferably, when the enclosure walls are thin, the step of closing said flow rate regulating means follows the following steps:

- dismounting the first and second filtering means;
- washing inner surfaces of the walls of said enclosure and said filtering means with a solution comprising said sterilizing chemical agent and a wetting agent;
- rinsing said inner surfaces and said filtering means;
- drying said inner surfaces and said filtering means;
- assembling the first and second filtering means.

In a preferred embodiment of the invention, the stage of operating said sterilizer comprises the steps of:

- heating said sterilizing chemical agent to a given temperature in order to vaporize said chemical agent;
- passing compressed air through said sterilizer to drive said vaporized chemical agent successively to said supply pipe, to the tight enclosure and to said discharge pipe.

The chemical agent used to perform sterilization can be either formaldehyde or peracetic or some other acid.

A non-limitative embodiment of the invention will now be described with reference to the attached drawing showing a tight enclosure equipped with a ventilating and filtering circuit constructed in accordance with the teachings of the present invention.

The accompanying drawing is a schematic view of a system in accordance with a preferred embodiment of the present invention showing the best mode now known to applicants for carrying out the invention.

The drawing shows a tight enclosure 10 isolating the air in sterile medium from the surrounding atmosphere. An enclosure like enclosure 10 can in particular be used for carrying out biological experiments or manipulations, e.g. on viruses or bacteria, or for working on radioactive products.

In order to protect an operator working outside the enclosure 10 from any microleak thereof, a permanent vacuum is produced within the enclosure by means of a discharge pipe 12 by which the air contained in the enclosure is sucked up by means of a suction fan 14, which discharges this air into the atmosphere outside the building in which the enclosure 10 is located, in order to protect personnel from residual vapours which emanate from the enclosure, particularly when carrying out sterilization processes. Two air filters 16 of the absolute type are placed in the pipe 12 at the outlet from enclosure 10 so as to retain contaminating products such as bacteria or viruses located in the enclosure. In per se known manner each of the filters 16 can be made from glass paper and mounted within a tight metal or plastic case. Each filter has an efficiency of 99,99% for $0.3\mu$ particles. An integral passage valve 18 is placed in pipe 12 between fans 14 and filters 16 in order to regulate the vacuum within the enclosure during sterilization operations.

If living beings are located in the enclosure 10, which is generally the case when it is being used for carrying out biological manipulations, it is necessary to regularly renew the air contained in the enclosure. This air renewal can be justified by the necessity of evacuating the calories or water vapour produced within the enclosure by equipment such as motors, baths or stoves. To this end an intake pipe 20 also issues into an anclosure 10 in order to supply to it air coming from the outside atmosphere by means of two series-connected, absolute filters 22. The filters 22 can be of the same type as the filters 16 fitted in the discharge pipe 12. A calibrated regulating valve 24 is also fitted in the intake pipe 20 upstream of filters 22, in order to regulate the air flow rate entering the enclosure 10.

The assembly constituted by the intake or supply pipe 20 and the discharge pipe 12 and by the different appliances fitted in the pipes constitutes a ventilating and filtering circuit which, in normal operation, establishes a given vacuum within enclosure 10, as well as the regular ventilation thereof. The arrows 26 in the drawing show the air outflow produced by the said circuit in normal operation.

According to the invention a given vacuum is to be maintained within enclosure 10 and the ventilation thereof is to be ensured, even in the case of a breakdown of the motor of fan 14 or in the case of a break to the seal of enclosure 10, resulting for example from a tear of one of the gloves by means of which the manipulations within the enclosure can take place. To obviate the necessity of duplicating the circuits which normally produces the vacuum within the enclosure, as well as ensuring the cooling thereof, according to the invention pipe 20 is used as a discharge or suction pipe and discharge pipe 12 as the intake or supply pipe under emergency operating conditions. To this end a second suction fan 28 is fitted in pipe 20 upstream of valve 27 during the normal operation of the circuit. In the case of a failure of the pump of motor 14 or a break in the seal of enclosure 10, the starting up of suction fan 28 controls by means of pipe 20 the maintaining of a vacuum within enclosure 20 and the air contained in the latter is regularly renewed by pipe 20. The air outflow direction is indicated by arrows 46 in the drawing.

In view of the fact that suction fan 28 must ensure that a vacuum is maintained in enclosure 10, even in the case of a break in the seal thereof, the power of said fan is higher than that of fan 14, which produces the vacuum under normal operating conditions. Thus, if it is assumed that the maximum accidental leak can only result from the complete tearing of a manipulating glove, which corresponds to a leakage surface area of 90 $cm^2$ and if it is desired to maintain an internal vacuum of 3 mm of head of water with a fresh air flow rate of 4 $m^3/h$, the power of the motor of fan 28 is 85 Watts, whereas that of the motor of fan 14 is 40 Watts.

In the embodiment shown in the drawing the starting up of the motor of fan 28 is automatically controlled by the drop in the pressure within enclosure 10, no matter what the cause of said pressure drop. To this end a pressostat 30 is connected with enclosure 10 by a pipe 32, which also contains an absolute filter 34 and an integral passage valve 36. Filter 34 is of the same type as filters 16 and 22 and protects pressostat 30 from any contamination, whilst the valve 36 makes it possible to isolate the latter from the enclosure whenever this is necessary and particularly during sterilization operations.

In the case of a drop of the pressure in enclosure 10, pressostat 30 emits a signal which is transmitted by an electrical circuit 38 to a conventional electronic control system 40 which, in turn, supplies a control signal transmitted by a line 42 to the motor of fan 28. Thus, when the vacuum within enclosure 10 drops to below a given value, the start of fan 38 is automatically controlled in order to reestablish the vacuum and the circulation of air in the direction of arrows 46 within enclosure 10.

During certain handling operations, the medium contained in the enclosure 10 must sometimes be sterilized. Thus, when the confinement enclosure forms an insulator adapted to keep germ-free animals in a sterile atmosphere, the assembly formed by the insulator and the equipment which it contains must be able to be sterilized before the start of an experiment, so as to enable the research worker to be certain that the germs or viruses which he is going to introduce into the enclosure are definitely the only sources of contamination. The same assembly must also be able to be decontaminated at the end of the experiment. Lastly, if any accident should occur, it must be possible to start to sterilize the insulator immediately.

The sterilization of the experimental insulator must enable the research worker to open such unit at the end of the cycle without the risk of contamination. For that reason sterilization covers not only the insulator itself, but also the supply and discharge filters and the equipment present in the insulator. Such sterilization must be completely effective, without being destructive. Thus, the insulator, the equipment which it contains, and the filters must be able to be re-used. In addition to such re-usable equipment, sterilization also covers the packages such as plastic bags or boxes containing products which are always contaminants (culture media, strains of bacteria) which must be stocked in that condition in the enclosure which are intended for destruction.

To meet these various objectives, chemical sterilization is performed by gas, using a sterilizer 44 connected to a supply duct 20, upstream of valve 24 and downstream of valve 27.

More precisely, the sterilizer 44 comprises a basin, means for heating the sterilizing solution introduced into the basin, and a compressed air circuit passing through the basin to entrain the vapours which are given off via discharge conduits 45. In this way a solution of a chemical sterilizing product introduced into the sterilizer basin is heated to about 40° C. The product can be formaldehyde or peracetic acid. The saturating vapours entrained by the compressed air pass through the "absolute" filters and therefore enable the upstream filters 22 and downstream filters 16 to be sterilized at the same time as the insulator.

In the most usual case, the walls of the enclosure 10 are thin and resilient, so that sterilization cannot be performed under pressure. In that case the actual sterilization must be preceded by a "presterilization", consisting in a preliminary washing of the inner surface of the enclosure 10 and the materials which it contains. The washing is performed using an antiseptic solution (a chemical sterilizing agent such as formaldehyde, peracetic acid, or the like, in dependence on which is used to perform sterilization), with the addition of a wetting agent such as that commercially available under the Trademark Teepol. The whole of the washed surfaces are then rinsed with sterile demineralized water. Lastly, these surfaces are preferably dried by means of sterilized rags in an autoclave.

Washing is performed by the insulator handling means (such as gloves, half diving-suits, driving-suits or the like)—i.e., without contamination of the personnel.

When this pre-sterilization has been performed, the actual sterilization can start. For this purpose, first the valves 27 and 34 are closed and the valve 18 is adjusted to obtain the required flowrate (e.g., 1800 liters per hour). The motor of the fan 14, is then started, so as to maintain the internal negative pressure during the whole sterilizing cycle.

The sterilizer 44 is then actuated to fill the closed volume (ducts 12 and 20, filters 16 and 22, enclosure 10) with saturated vapours of formaldehyde or peracetic acid. The duration of sterilization must be adequate to be completely effective. In this respect it will be noted more particularly that peracetic acid, which has a considerable bactericidal and sporicidal power, is therefore characterized by a fast action, while formaldehyde requires a long contact time to be properly effective (about 1 hour 30 minutes in the case of peracetic acid, as against about 12 hours for formaldehyde, if the sterilizing time is tripled as a safety measure). However, the fact action of peracetic acid is accompanied by a considerable oxidizing power which is in practice resisted only by glass, plastic materials, stainless steel and aluminium, while on the contrary formaldehyde has only a low power of chemical aggression, which enables it to be used to sterilize metallic materials, electric materials, etc. However, when sterilizing using formaldehyde, the ambient temperature must be controlled, as is not the case when peracetic acid is used.

Sterilization is performed in open circuit—i.e., the residual vapours leaving the insulator during the sterilizing cycle are ejected to atmosphere via the discharge duct 12. Of course, so as not to inconvenience the personnel working in the laboratory, the vapours are ejected from the building via a sealed sheath (not shown) connected to the outlet of the fan 14.

Preferably the end of the insulator is covered with a metal grating adapted to enable the vapours to sterilize the equipment on all its faces.

The automatic sterilizing cycle covering the insulator, the filters, the handling means used for the preliminary washing and the materials contained in the enclosure is performed without the personnel having to take direct action in the closed volume. Moreover, the extraction fan 14 enables negative pressure to be maintained in the enclosure 10 during the whole sterilizing cycle.

When sterilization has been completed, the sterilizer 44 is stopped and the normal ventilating circuit started up so as to sweep away the residual vapours of sterilizing agent. In other words, the valves 34 and 27 are opened, the valve 24 is adjusted to the required flowrate, and the fan 14 continues to operate.

The invention is obviously not limited to the embodiments described and represented hereinbefore and various modifications can be made thereto without passing beyond the scope of the invention. Thus, the medium contained within the enclosure need not be atmospheric air. The supply and optionally discharge pipes are then connected to suitable conventional supply and discharge circuits.

Moreover it has been seen that the invention can be applied to enclosures both with excess pressure and negative pressure, the supply and discharge ducts and the direction of operation of the fan being reversed (in which case the arrows 46 indicate normal operation and the arrows 26 emergency operation).

We claim:

1. A process for establishing and maintaining a vacuum within a ventilated and filtered air tight enclosure, said process comprising:

introducing a filtered medium into the enclosure through a supply pipe having a first filtering means in the supply pipe;

establishing a vacuum in the enclosure by employing an enclosure discharge pipe which discharges the medium from the enclosure in a normal flow direction and which is connected to a means for establishing the vacuum, the discharge pipe having a second filtering means, and by regulating the flow rate in the supply pipe; and maintaining the vacuum in the enclosure in the event of a failure by sensing the pressure within the enclosure and actuating a means for maintaining the vacuum upon a predetermined rise in pressure within the enclosure; the means for maintaining the vacuum being connected to the supply pipe upstream of the first filtering means and operable to reverse the flow of the medium in the supply pipe.

2. A process in accordance with claim 1, which further comprises sterilizing the enclosure by the steps of:

providing a valve means in the supply pipe upstream of the first filtering means;

connecting a chemical sterilizer to the supply pipe between the valve means and the first filtering means;

closing the valve means;

operating the means for establishing the vacuum within the enclosure;

operating the sterilizer for supplying saturating vapors of a sterilizing chemical agent successively to the supply pipe, including the first filtering means to the air tight enclosure and to the discharge pipe, including the second filtering means;

stopping the sterilizer after a given period of time;

opening the valve means; and pursuing operation of the means for establishing the vacuum within the enclosure to sweep the saturating vapors of the sterilizing chemical agent.

3. A process in accordance with claim 2, wherein the step of closing the valve means follows the following steps:

dismounting the first and second filtering means;

washing inner surfaces of the walls of said enclosure and said filtering means with a solution comprising said sterilizing chemical agent and a wetting agent;

rinsing said inner surfaces and said filtering means;

drying said inner surfaces and said filtering means; and assembling the first and second filtering means.

4. A process in accordance with claim 2, wherein the step of operating the sterilizer comprises the steps of:

heating the sterilizing chemical agent to a given temperature in order to vaporize the chemical agent; and passing compressed air through the sterilizer to drive the vaporized chemical agent successively to the supply pipe to the air tight enclosure and the discharge pipe.

5. A process according to claim 4, wherein the chemical agent is formol.

6. A process according to claim 4, wherein the chemical agent is paracetic acid.

7. A process in accordance with claim 2, wherein the step of operating the sterilizer comprises the steps of:

heating the sterilizing chemical agent to a given temperature in order to vaporize the chemical agent; and passing compressed air through the sterilizer to drive the vaporized chemical agent successively to the supply pipe to the air tight enclosure and the discharge pipe.

8. A process according to claim 7, wherein the chemical agent is formal.

9. A process according to claim 7, wherein the chemical agent is paracetic acid.

10. A circuit for ventilating and filtering the medium contained in an air tight enclosure and for establishing and maintaining a permanent vacuum within said enclosure, comprising a normal ventilating circuit, means for introducing the medium into the circuit including a supply pipe issuing into the enclosure to supply the enclosure with said medium, and a discharge pipe which discharges the medium from the enclosure in a normal flow direction, flow rate regulating means and first filtering means for said supply pipe, second filtering means and means for establishing the vacuum within the enclosure for said discharge pipe, said circuit further comprising means for maintaining the vacuum within the enclosure, said means for maintaining the vacuum including means for actuating said vacuum maintaining means upon a predetermined rise in pressure in the enclosure in case of failure in the normal ventilating circuit, said means for maintaining the vacuum being located in said supply pipe upstream of said first filtering means reversing the flow of the medium in the circuit from the normal direction of flow.

11. A circuit according to claim 10, wherein said circuit further comprises detecting means communicating with the enclosure detecting a drop in the vacuum within the enclosure, said detecting means automatically controlling the starting of said means for maintaining the vacuum within the enclosure.

12. A circuit according to claim 11, wherein said means for detecting a drop in the vacuum is a pressostat communicating with the enclosure by a pipe, third filtering means in said pipe and means for interrupting the connection between the enclosure and said pressostat.

13. A ventilating and filtering circuit according to any one of claims 10, 11 and 12, wherein a sterilizer is connected to said supply pipe between said first filtering means and said means for maintaining the vacuum within the enclosure.

14. A circuit according to claim 11 or claim 3 wherein said means for maintaining the vacuum within the enclosure is more powerful than said means for establishing the vacuum within the enclosure.

15. A ventilating and filtering circuit according to claim 14, wherein a sterilizer is connected to said supply pipe between said first filtering means and said means for maintaining the vacuum within the enclosure.

16. A circuit for ventilating and filtering the medium contained in an air tight enclosure and for establishing and maintaining a permanent over-pressure within said enclosure, comprising a normal ventilating circuit, means for introducing the medium into the circuit including a supply pipe issuing into the enclosure to supply the enclosure with said medium, and a discharge pipe which discharges the medium from the enclosure in a normal flow direction, flow rate regulating means and first filtering means for said discharge pipe, second filtering means and means for establishing the over-pressure within the enclosure for said supply pipe, said circuit further comprising means for maintaining the over-pressure within the enclosure, said means for maintaining the over-pressure including means for actuating said over-pressure maintaining means upon a predetermined decrease in pressure in the enclosure in case of failure in the normal ventilating circuit, said means for maintaining the over-pressure being located in said discharge pipe downstream of said first filtering means reversing the flow of the medium in the circuit from the normal direction of flow.

17. A circuit according to claim 16, wherein said circuit further comprises detecting means communicating with the enclosure detecting a drop in the pressure within the enclosure, said detecting means automatically controlling the starting of said means for maintaining the over-pressure within the enclosure.

18. A circuit according to claim 17, wherein said means for detecting a drop in the pressure is a pressostat communicating with the enclosure by a pipe, third filtering means in said pipe and means for interrupting the connection between the enclosure and said pressostat.

19. A ventilating and filtering circuit according to any one of claims 16, 17 and 18, wherein a sterilizer is connected to said supply pipe between said first filtering means and said means for maintaining the over-pressure within the enclosure.

20. A circuit according to claim 17 or claim 18, wherein said means for maintaining the over-pressure within the enclosure is more powerful than said means for establishing the over-pressure within the enclosure.

21. A ventilating and filtering circuit according to claim 20, wherein a sterilizer is connected to said supply pipe between said first filtering means and said means for maintaining the over-pressure within the enclosure.

* * * * *